United States Patent
Vedula et al.

(10) Patent No.: US 10,064,224 B2
(45) Date of Patent: Aug. 28, 2018

(54) METHOD AND SYSTEM FOR ESTABLISHING WIRELESS FIDELITY DIRECT (WFD) CONNECTION IN A WFD NETWORK ENVIRONMENT

(71) Applicant: Samsung Electronics Co., Ltd., Gyeonggi-do (KR)

(72) Inventors: Kiran Bharadwaj Vedula, Bangalore (IN); Venkateswar Jeedigunta, Bangalore (IN); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 14/428,292

(22) PCT Filed: Sep. 30, 2013

(86) PCT No.: PCT/KR2013/008726
§ 371 (c)(1),
(2) Date: Mar. 13, 2015

(87) PCT Pub. No.: WO2014/051399
PCT Pub. Date: Apr. 3, 2014

(65) Prior Publication Data
US 2015/0282229 A1 Oct. 1, 2015

(30) Foreign Application Priority Data

Sep. 28, 2012 (IN) .......................... 4083/CHE/2012

(51) Int. Cl.
*H04W 4/00* (2009.01)
*H04W 76/02* (2009.01)
(Continued)

(52) U.S. Cl.
CPC ....... *H04W 76/023* (2013.01); *H04L 67/1068* (2013.01); *H04L 67/16* (2013.01);
(Continued)

(58) Field of Classification Search
None
See application file for complete search history.

(56) References Cited

U.S. PATENT DOCUMENTS 8,559,340 B2 * 10/2013 Verma ................. H04L 12/2809
370/255
9,504,069 B2 * 11/2016 Jeong .................... H04W 8/005
(Continued)

FOREIGN PATENT DOCUMENTS

| CN | 102523287 | 6/2012 |
|----|-----------|--------|
| EP | 2 056 544 | 5/2009 |

(Continued)

OTHER PUBLICATIONS

PCT/ISA/210 Search Report issued on PCT/KR2013/008726 (pp. 3).
(Continued)

*Primary Examiner* — Phirin Sam
(74) *Attorney, Agent, or Firm* — The Farrell Law Firm, P.C.

(57) ABSTRACT

A method and system for establishing a Wireless Fidelity (Wi-Fi) Direct (WFD) connection between Wi-Fi devices are provided. The method includes transmitting, by a source Wi-Fi device, a probe request frame indicating a first set of parameters through a pre-defined channel, wherein the first set of parameters comprises a persistence capability and persistence information; receiving a probe response frame indicating a second set of parameters from a destination Wi-Fi device, wherein the second set of parameters comprises discovery information associated with the destination Wi-Fi device; persistently storing the discovery information associated with the destination Wi-Fi device at the source (Continued)

Wi-Fi device; and establishing a WFD connection with the destination Wi-Fi device using the persistently stored discovery information.

18 Claims, 10 Drawing Sheets

(51) Int. Cl.
  *H04W 8/00* (2009.01)
  *H04L 29/08* (2006.01)
  *H04W 12/04* (2009.01)
  *H04W 76/14* (2018.01)
  *H04W 84/12* (2009.01)

(52) U.S. Cl.
  CPC ........... *H04W 8/005* (2013.01); *H04W 12/04* (2013.01); *H04W 76/14* (2018.02); *H04W 84/12* (2013.01)

(56) References Cited

U.S. PATENT DOCUMENTS

| | | |
|---|---|---|
| 2007/0008922 A1 | 1/2007 | Abhishek et al. |
| 2011/0103264 A1* | 5/2011 | Wentink ................ H04W 8/005 370/255 |
| 2011/0280233 A1 | 11/2011 | Choi et al. |
| 2011/0281557 A1 | 11/2011 | Choi et al. |
| 2011/0320539 A1 | 12/2011 | Zhao et al. |
| 2012/0134349 A1* | 5/2012 | Jung ..................... H04W 8/005 370/338 |
| 2012/0158839 A1 | 6/2012 | Hassan et al. |
| 2012/0250576 A1* | 10/2012 | Rajamani .............. H04W 8/005 370/254 |
| 2013/0109314 A1* | 5/2013 | Kneckt ................. H04W 4/008 455/41.2 |
| 2013/0227152 A1 | 8/2013 | Lee et al. |
| 2013/0331031 A1* | 12/2013 | Palin ................. H04W 52/0245 455/41.2 |
| 2014/0314065 A1* | 10/2014 | Song ..................... H04W 8/005 370/338 |
| 2015/0223147 A1* | 8/2015 | Fujishiro ............. H04W 8/005 370/329 |
| 2016/0192282 A1* | 6/2016 | Elhaddad ............. H04W 8/005 455/434 |

FOREIGN PATENT DOCUMENTS

| | | |
|---|---|---|
| EP | 2 133 790 | 12/2009 |
| EP | 2 416 617 | 2/2012 |
| KR | 1020120045628 | 5/2012 |
| WO | WO 2012/060611 | 5/2012 |

OTHER PUBLICATIONS

European Search Report dated Mar. 2, 2016 issued in counterpart application No. 13841103.8-1870, 8 pages.

Chinese Office Action dated Sep. 18, 2017 issued in counterpart application No. 201380051083.0, 31 pages.

* cited by examiner

| PARAMETER | VALUE |
|---|---|
| DEVICE DISCOVERY INFORMATION PERSISTENCE | 1 - SUPPORTED |
| | 0 - NOT SUPPORTED |
| SERVICE DISCOVERY INFORMATION PERSISTENCE | 1 - SUPPORTED |
| | 0 - NOT SUPPORTED |

| PARAMETER | VALUE |
|---|---|
| DEVICE DISCOVERY INFORMATION | 1 - VERSION OF DEVICE DISCOVERY INFO ⋮ N - VERSION OF DEVICE DISCOVERY INFO |
| SERVICE DISCOVERY INFORMATION | 1 - VERSION OF SERVICE DISCOVERY INFO ⋮ N - VERSION OF SERVICE DISCOVERY INFO |

| PARAMETER | VALUE |
|---|---|
| 0 | NOTICE OF ABSENCE |
| 1 | P2P PRESENCE REQUEST |
| 2 | P2P PRESENCE RESPONSE |
| 3 | GO DISCOVERABILITY REQUEST |
| 4 | DISCOVERY EVENT NOTIFICATION |
| 4-255 | RESERVED |
FIG.6B
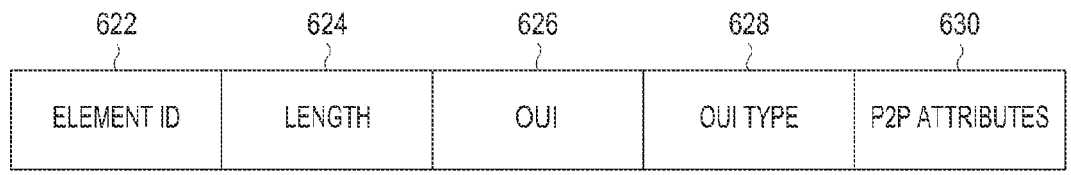
FIG.6C
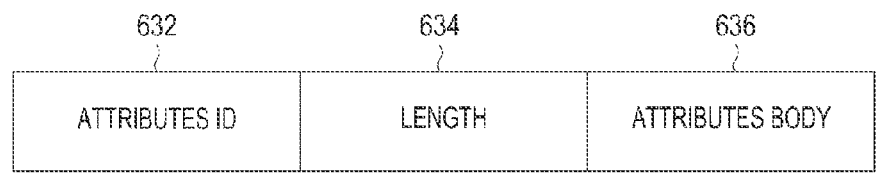
FIG.6D

| ATTRIBUTE ID | NOTES |
|---|---|
| 0 | STATUS |
| 1 | MINOR REASON CODE |
| 2 | P2P CAPABILITY |
| 3 | P2P DEVICE ID |
| 4 | GROUP OWNER INTENT |
| 5 | CONFIGURATION TIME OUT |
| 6 | LISTEN CHANNEL |
| 7 | P2P GROUP BSSID |
| 8 | EXTENDED LISTEN TIMING |
| 9 | INTENDED P2P INTERFACE ADDRESS |
| 10 | P2P MANAGEABILITY |
| 11 | CHANNEL LIST |
| 12 | NOTICE OF ABSENCE |
| 13 | P2P DEVICE INFO |
| 14 | P2P GROUP INFO |
| 15 | P2P GROUP ID |
| 16 | P2P INTERFACE |
| 17 | OPERATING CHANNEL |
| 18 | INVITATION FLAGS |
| 19 | DISCOVERY EVENT NOTIFICATION |
| 20 - 220 | RESERVED |
| 221 | VENDOR SPECIFIC ATTRIBUTE |
| 222 - 225 | RESERVED |

FIG.6E

METHOD AND SYSTEM FOR ESTABLISHING WIRELESS FIDELITY DIRECT (WFD) CONNECTION IN A WFD NETWORK ENVIRONMENT

This application is a National Phase Entry of PCT International Application No. PCT/KR2013/008726, which was filed on Sep. 30, 2013, and claims priority to Indian Patent Application No. 4083/CHE/2012, which was filed in the Indian Intellectual Property Office on Sep. 28, 2012, the entire content of which is incorporated herein by reference.

BACKGROUND OF THE INVENTION

1. Field of the Invention

The present invention generally relates to the field of wireless communications, and more particularly, to a method and system for establishing a Wireless Fidelity (Wi-Fi) direct (WFD) connection in a Wi-Fi direct network environment.

2. Description of the Related Art

A Wi-Fi direct (WFD) network is a network system suggested by the Wi-Fi Alliance that enables Wi-Fi devices to be connected to each other in a peer-to-peer fashion without participating in a home network, an office network, or a hot-spot network. For setting up a connection, a Wi-Fi device (i.e., a searching Wi-Fi device) performs device discovery to discover Wi-Fi devices in a Wi-Fi direct network environment. During the device discovery, the searching Wi-Fi device sends a probe request frame through a pre-defined channel. The probe request frame includes information such as Peer to Peer (P2P) Information Element (IE), P2P wildcard Service Set IDentifier (SSID), wildcard SSID, Destination Address, Device type and Device IDentifier (ID). The other Wi-Fi devices in the WFD network environment listen to the probe request frame transmitted through the pre-defined channel. Each of the other Wi-Fi devices determines whether the information in the probe request frame matches the search criteria. If the match is found, then the discovered Wi-Fi device(s) sends a probe response frame with device description to the searching Wi-Fi device.

Upon discovery of the Wi-Fi device, the searching Wi-Fi device performs service discovery with the discovered Wi-Fi device to obtain services supported by the discovered Wi-Fi device. During the service discovery, the searching Wi-Fi device sends a Generic Advertisement Service (GAS) initial request to the discovered Wi-Fi device. In response, the discovered Wi-Fi device sends a GAS initial response with service information to the searching Wi-Fi device. Thereafter, the searching Wi-Fi device sets up a WFD connection with the discovered Wi-Fi device using device and service description obtained from the discovered Wi-Fi device.

The Wi-Fi devices negotiate their capabilities and establish a WFD session for sharing data with each other. When the data sharing is complete, the WFD connection between the Wi-Fi devices is terminated. A new WFD connection is established when the user of the Wi-Fi device wishes to again share data with the discovered Wi-Fi device. For establishing the WFD connection, the Wi-Fi device needs to perform discovery of the Wi-Fi device and discovery of services supported by the Wi-Fi device. This may lead to latency in re-establishing the WFD connection with the Wi-Fi device.

SUMMARY OF THE INVENTION

The present invention has been made to solve at least the above-mentioned problems and/or disadvantages and to provide at least the advantages described below. In accordance with an aspect of the present invention, a method of establishing a Wireless Fidelity (Wi-Fi) Direct (WFD) connection in a WFD network environment is provided, which includes transmitting, by a source Wi-Fi device, a probe request frame indicating a first set of parameters through a pre-defined channel, wherein the first set of parameters comprises a persistence capability and persistence information; receiving a probe response frame indicating a second set of parameters from a destination Wi-Fi device, wherein the second set of parameters comprises discovery information associated with the destination Wi-Fi device; persistently storing the discovery information associated with the destination Wi-Fi device at the source Wi-Fi device; and establishing a WFD connection with the destination Wi-Fi device using the persistently stored discovery information.

In accordance with another aspect of the present invention, an apparatus is provided, which includes a Wi-Fi module configured for: transmitting a probe request frame indicating a first set of parameters through a pre-defined channel, wherein the first set of parameters comprises a persistence capability and persistence information; and receiving a probe response frame indicating a second set of parameters from a destination Wi-Fi device, wherein the second set of parameters comprises discovery information associated with the destination Wi-Fi device; and a control unit coupled to the Wi-Fi module and configured for: persistently storing the discovery information associated with the destination Wi-Fi device in a storage unit; and establishing a WFD connection with the destination Wi-Fi device using the persistently stored discovery information.

In accordance with another aspect of the present invention, a method of notifying a change in discovery information in a Wireless Fidelity (Wi-Fi) Direct (WFD) network environment is provided, which includes receiving, by a destination Wi-Fi device, a probe request frame indicating a first set of parameters through a pre-defined channel; transmitting a probe response frame indicating a second set of parameters to a source Wi-Fi device in response to the probe request frame, wherein the second set of parameters comprises discovery information; detecting a change in the discovery information transmitted in the probe response frame; and transmitting a discovery event notification frame with a discovery event notification attribute to the source Wi-Fi device when the change in the discovery information transmitted in the probe response frame is detected, wherein the discovery event notification attribute comprises an event type indicating a type of the discovery information and a version indicator indicating a version of the discovery information.

In accordance with another aspect of the present invention, an apparatus is provided, which includes a Wi-Fi module; and a control unit coupled to the Wi-Fi module, wherein the Wi-Fi module is configured for receiving a probe request frame indicating a first set of parameters through a pre-defined channel, wherein the Wi-Fi module is configured for transmitting a probe response frame indicating a second set of parameters to a source Wi-Fi device in response to the probe request frame, and the second set of parameters comprises discovery information, wherein the control unit is configured for detecting a change in the discovery information transmitted in the probe response frame, and wherein the Wi-Fi module is configured for transmitting a discovery event notification frame with a discovery event notification attribute to the source Wi-Fi device when the change in the discovery information transmitted in the probe response frame is detected, and the discovery event notification attribute comprises an event type indicating a type of the discovery information and a version indicator indicating a version of the discovery information.

BRIEF DESCRIPTION OF THE DRAWINGS

The above and other aspects, features, and advantages of certain embodiments of the present invention will be more apparent from the following detailed description, taken in conjunction with the accompanying drawings, in which:

FIGS. 6A-6F are schematic representations illustrating a format of a discovery event notification, according to an embodiment of the present invention.

DETAILED DESCRIPTION OF EMBODIMENTS OF THE PRESENT INVENTION

The present invention provides a method and system for establishing a Wireless Fidelity (Wi-Fi) Direct (WFD) connection between Wi-Fi devices. In the following detailed description of the embodiments of the invention, reference is made to the accompanying drawings that form a part hereof, and in which specific embodiments in which the invention may be practiced are shown by way of illustration. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims and their equivalents.

It is to be understood that the singular forms "a", "an", and "the" include plural referents unless the context clearly dictates otherwise. Thus, for example, reference to "a Wi-Fi device" includes reference to one or more of such Wi-Fi devices.

Figure 1:
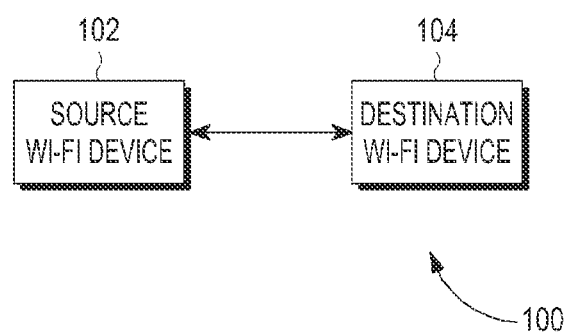
FIG. 1 is a block diagram of a Wireless Fidelity (Wi-Fi) Direct (WFD) system, according to an embodiment of the present invention.

FIG. 1 is a block diagram of a Wireless Fidelity (Wi-Fi) Direct (WFD) system 100, according to an embodiment of the present invention. The system 100 includes a source Wi-Fi device 102 and a destination Wi-Fi device 104. The source Wi-Fi device 102 and the destination Wi-Fi device 104 may be a portable terminal such as a smart phone, a notebook computer, a tablet, and the like, or an electronic device such as a Television (TV), a printer, a camera, and the like.

In an embodiment of the present invention, the Wi-Fi devices 102 and 104 include a WFD connection establishment module having a standard equal to or higher than Institute of Electrical and Electronics Engineers (IEEE) 802.11g (for example, 802.11g or 802.11n) and corresponds to a Wi-Fi Direct certified device.

Figure 2:
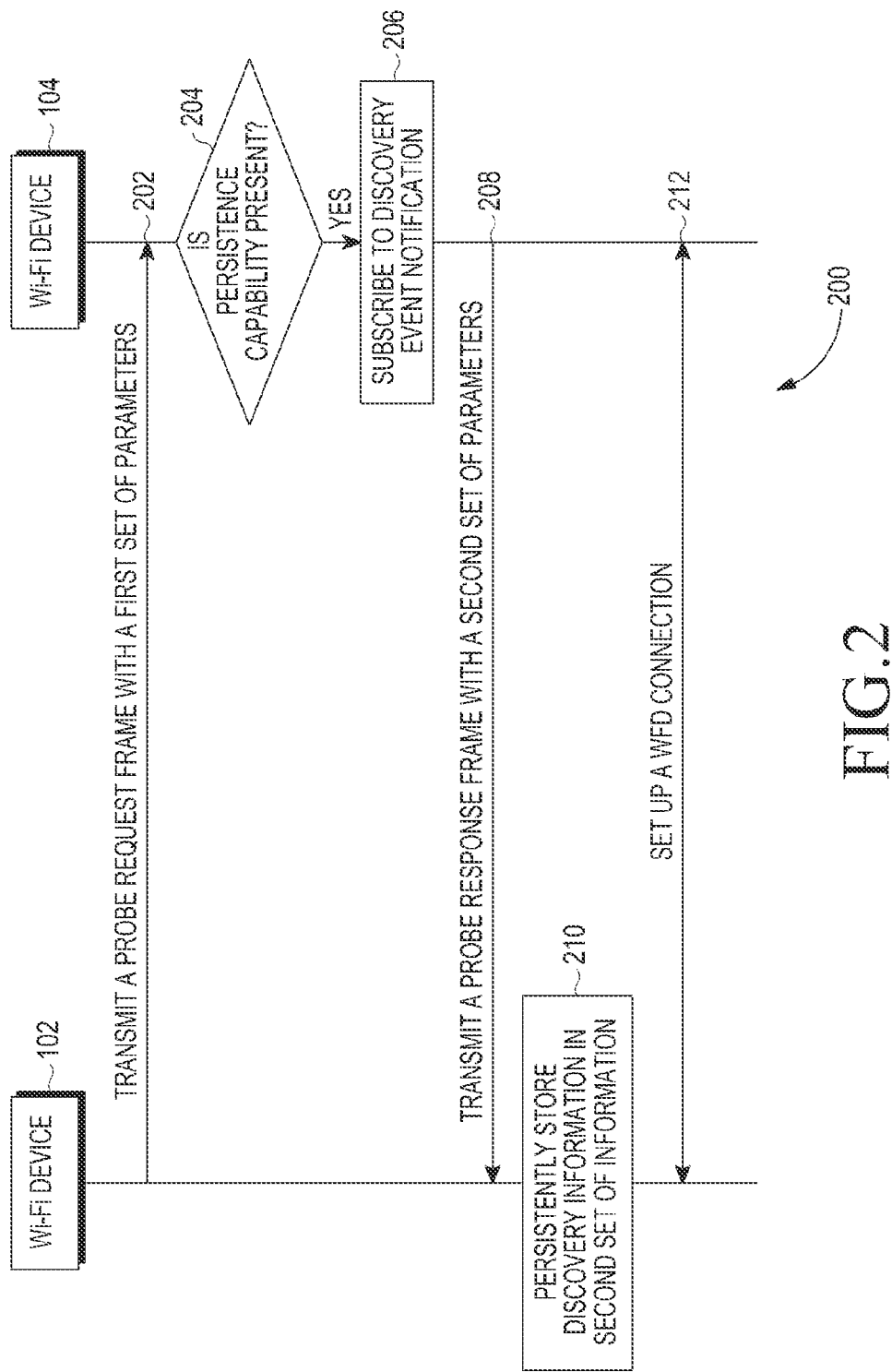
FIG. 2 is a flow diagram illustrating a method of establishing a WFD connection between Wi-Fi devices in a WFD network environment, according to an embodiment of the present invention.

FIG. 2 is a flow diagram 200 illustrating a method of establishing a WFD connection between Wi-Fi devices 102 and 104 in a WFD network environment, according to an embodiment of the present invention. When a user makes a request for a WFD connection, at step 202, the source Wi-Fi device 102 transmits a probe request frame with a first set of parameters through a pre-defined channel. The first set of parameters includes a Peer to Peer (P2P) Information Element (IE), a persistence capability, and persistence information. The P2P IE contains a device name, a device type, and a device identifier (ID). The persistence capability indicates capability to persistently store device discovery information and service discovery information. The persistence information indicates the version of the discovery information that is persistently stored during transmitting the probe request frame. The source Wi-Fi device 102 sends the probe request frame through one or more channels through which the destination Wi-Fi device 104 support communication.

At step 204, the destination Wi-Fi device 104 determines whether the source Wi-Fi device 102 can persistently store the device discovery information and the service discovery information (that is, whether the persistence capability is present with the received probe request frame). If the source Wi-Fi device 102 can persistently stores the device discovery information and the service discovery information (that is, the persistence capability is present), then at step 206, the destination Wi-Fi device 104 subscribes discovery event notifications. By subscribing the discovery event notifications, the discovery event notifications are automatically sent to the source Wi-Fi device 102 when there is change in the device discovery information and/or the service discovery information.

At step 208, the destination Wi-Fi device 104 sends a probe response frame including a second set of parameters to the source Wi-Fi device 104. The second set of parameters includes P2P IE, a discovery counter, and a validity timer. The validity timer indicates a time period for which the device discovery information and the service discovery information are valid from the receipt point of the probe response frame. The P2P IE includes device discovery information and service discovery information such as Medium Access Control (MAC) address, WFD capability details, group formation capability details, etc. The discovery counter indicates whether the device discovery information and/or the service discovery information are changed. At step 210, the source Wi-Fi device 102 persistently stores the device discovery information and the service discovery information. At step 212, the source Wi-Fi device 102 sets up a WFD connection with the destination Wi-Fi device 104 using the discovery information (e.g., the device discovery information and/or the service discovery information).

Figures 3A, 3B:
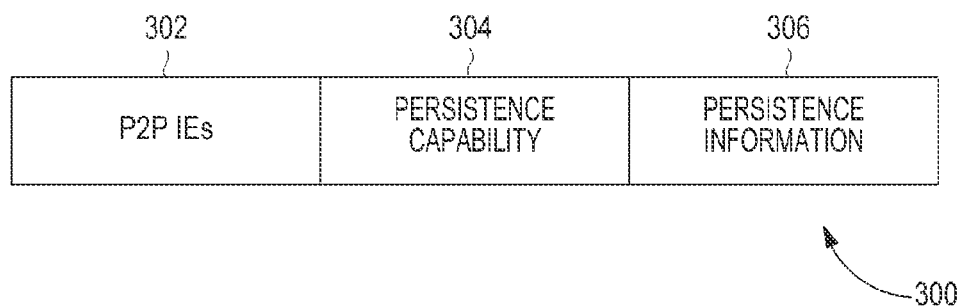
FIG. 3A is a schematic representation illustrating a probe request frame, according to an embodiment of the present invention.
FIG. 3B is a tabular representation illustrating exemplary values used to indicate a persistence capability of a source Wi-Fi device.

FIG. 3A is a schematic representation illustrating a probe request frame 300, according to an embodiment of the present invention. The probe request frame 300 includes a P2P IEs field 302, a persistence capability field 304, and a persistence information field 306.

The P2P IEs field 302 contains a device name, a device type and a device identifier (ID). The persistence capability field 304 indicates capability of the source Wi-Fi device to persistently store discovery information. For example, the persistence capability field 304 is set to a value '1' when the source Wi-Fi device 102 supports persistence storage. If the source Wi-Fi device 102 does not support persistence storage, then the persistence capability field is set to a value '0'. The different values used to indicate the persistence capability of the source Wi-Fi device 102 is shown in FIG. 3B. Referring to FIG. 3B, if the source Wi-Fi device 102 supports persistence of device discovery information and does not support persistence of service discovery information, the persistent capability field 304 is set to '10'. Alternatively, if the source Wi-Fi device 102 supports persistence of service discovery information and does not support persistence of device discovery information, the persistent capability field 304 is set to '01'. If both types of discovery information are supported, then the persistence capability field 304 is set to '11'.

The persistence information field 306 indicates a version of the discovery information that is persistently stored during transmitting the probe request frame. For example, the source Wi-Fi device 102 maintains a discovery counter indicating the version of the persistently stored discovery information. When the source Wi-Fi device 102 does not have the discovery information, then the discovery counter is set to '0'. The same is indicated in the persistence information field 306. Also, the value '0' in the persistence information field 306 indicates the destination Wi-Fi device 104 that the source Wi-Fi device 102 is searching for the first time. Any value other than '0' indicates that the previous discovery is already performed.

Figure 3C:
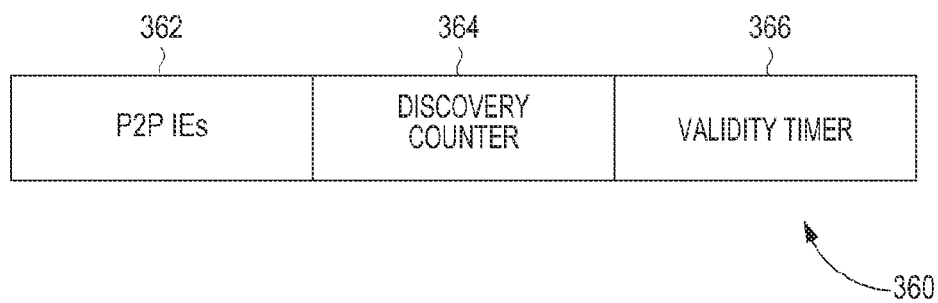
FIG. 3C is a schematic representation illustrating a probe response frame, according to an embodiment of the present invention.

FIG. 3C is a schematic representation illustrating a probe response frame 360, according to an embodiment of the present invention. The probe response frame 360 includes a P2P IEs field 362, a discovery counter field 364, and a validity timer field 366.

Figure 3D:
FIG. 3D is a tabular representation illustrating values of a discovery counter for device discovery information and service discovery information.

The P2P IEs field 362 contains information such as MAC address, WFD capability details, group formation capability details, etc. The discovery counter field 364 indicates a current version of the discovery information. Examples of values of the discovery counter for the device discovery information and the service discovery information are shown in FIG. 3D. Referring to FIG. 3D, the destination Wi-Fi device 104 sets the value of the discovery counter field 364 equal to the version number associated with the discovery information. For example, the discovery counter field 364 may contain values indicating the version number of the device discovery information and the version number of the service discovery information. The destination Wi-Fi device 104 maintains a discovery counter value to keep tracking the current version of the device and service discovery information. When the discovery information is modified, the destination Wi-Fi device 104 increments a discovery counter value by a value '1'. The validity timer field 366 indicates a time period (in milliseconds) for which the discovery information in the P2P IEs field 352 is valid from the receipt point of the probe response frame 350.

Figure 4:
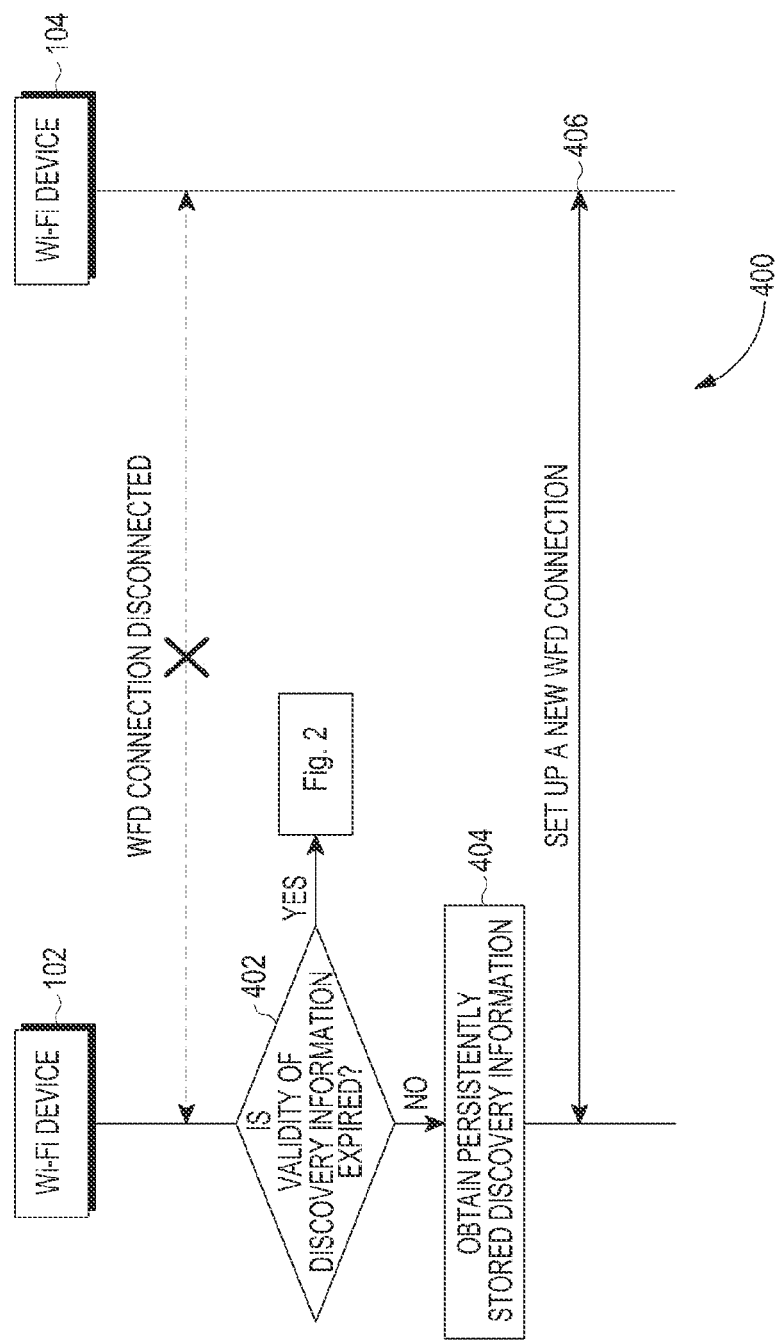
FIG. 4 is a flow diagram illustrating a method of setting up a WFD connection between a source Wi-Fi device and a destination Wi-Fi device using persistently stored discovery information, according to an embodiment of the present invention.

FIG. 4 is a flow diagram 400 illustrating a method of setting up a WFD connection between the source Wi-Fi device 102 and the destination Wi-Fi device 104 using the persistently stored discovery information, according to an embodiment of the present invention. Here, the WFD connection between the source Wi-Fi device 102 and the destination Wi-Fi device 104 is disconnected, and the user of the source Wi-Fi device 102 wishes to establish a WFD connection with the destination Wi-Fi device 104. At step 402, the source Wi-Fi device 102 determines whether a validity timer of the discovery information expires. If the validity timer of the discovery information does not expire, at step 404, the source Wi-Fi device 102 obtains the persistently stored discovery information associated with the destination Wi-Fi device 104. At step 406, the source Wi-Fi device 102 establishes a WFD connection with the destination Wi-Fi device 104 using the persistently stored discovery information. If the validity timer of the discovery information expires, then steps 202 to 212 of FIG. 2 are performed.

Figure 5:
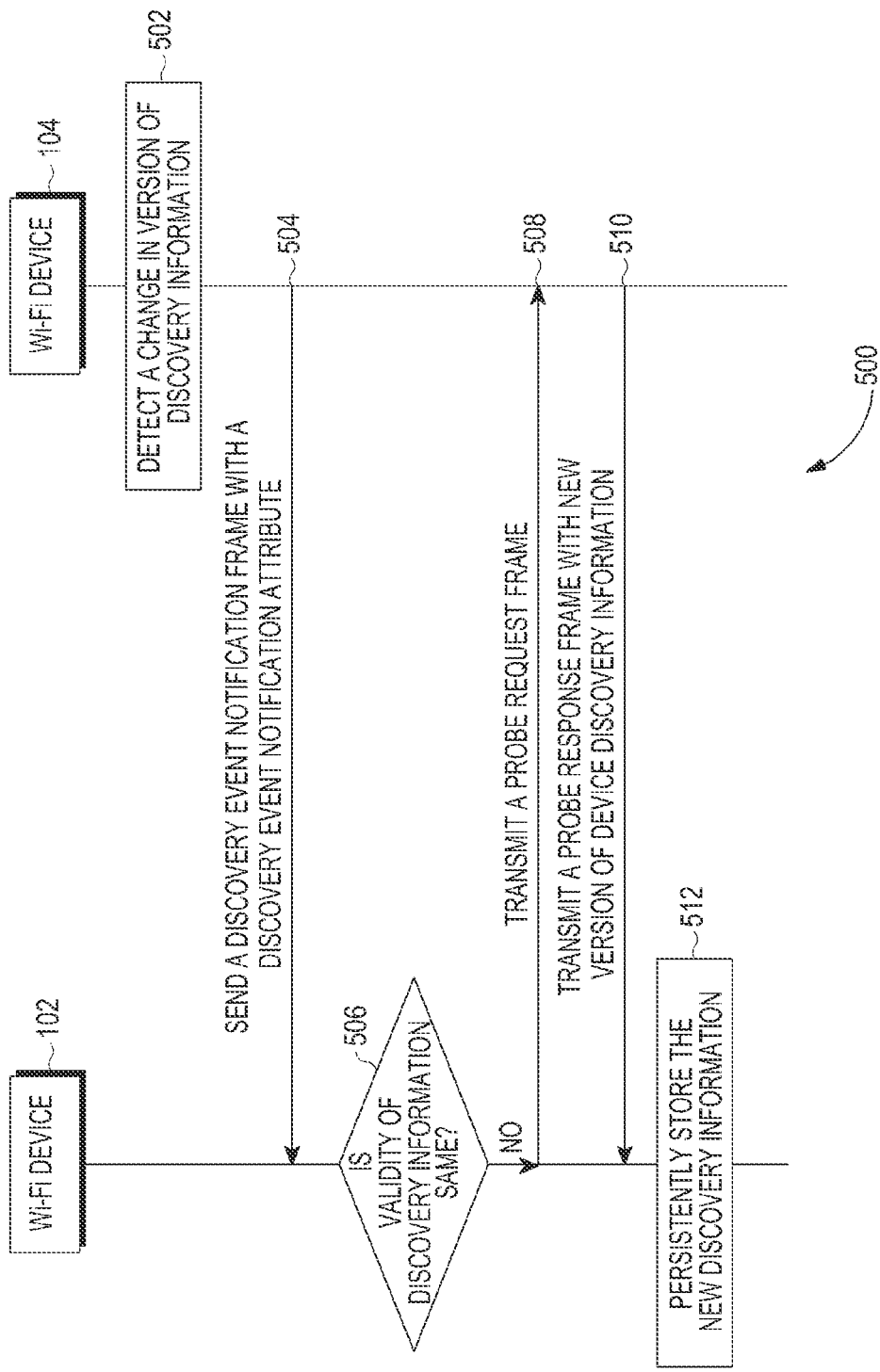
FIG. 5 is a flow diagram illustrating a method of transmitting a discovery event notification to the source Wi-Fi device when the discovery information changes, according to an embodiment of the present invention.

FIG. 5 is a flow diagram 500 illustrating a method of transmitting a discovery event notification to the source Wi-Fi device 102 when the discovery information changes, according to an embodiment of the present invention. At step 502, a change in the version of the discovery information is detected. At step 504, the destination Wi-Fi device 104 sends a discovery event notification frame with a discovery event notification attribute to the source Wi-Fi device 102. The discovery event notification frame indicates that the version of the discovery information persistently stored at the source Wi-Fi device 102 is changed. In some embodiments of the present invention, the discovery event notification attribute includes an event type indicating the type of discovery information (e.g., service discovery information or device discovery information), and a version indicator indicating the version of the discovery information.

At step 506, the source Wi-Fi device 102 determines whether the version of the discovery information in the discovery event notification attribute is different from the version of the persistently stored discovery information. If the version is not changed, then at step 514, the source Wi-Fi device 102 does not transmits a probe request frame to the destination Wi-Fi device 104 through the pre-defined channel. If the version is changed, then at step 508, the source Wi-Fi device 102 transmits a probe request frame to the destination Wi-Fi device 104 through the pre-defined channel. At step 510, the destination Wi-Fi device 104 sends a probe response frame including a newer version of the discovery information in response to the probe request frame. At step 512, the source Wi-Fi device 102 persistently stores the newer version of the discovery information received in the probe response frame.

FIGS. 6A-6F are schematic representations illustrating a format of a discovery event notification, according to an embodiment of the present invention. If the source Wi-Fi device 102 supports persistence storage, the destination Wi-Fi device 104 sends a discovery event notification to the source Wi-Fi device 102 when there is a change in the version of device discovery information and/or service discovery information. For example, the destination Wi-Fi device 104 sends a P2P action frame to the source Wi-Fi device 102 to notify the change in the version of the persistently stored discovery information. A P2P action frame format 600 is illustrated as an example in FIG. 6A.

Figure 6A:
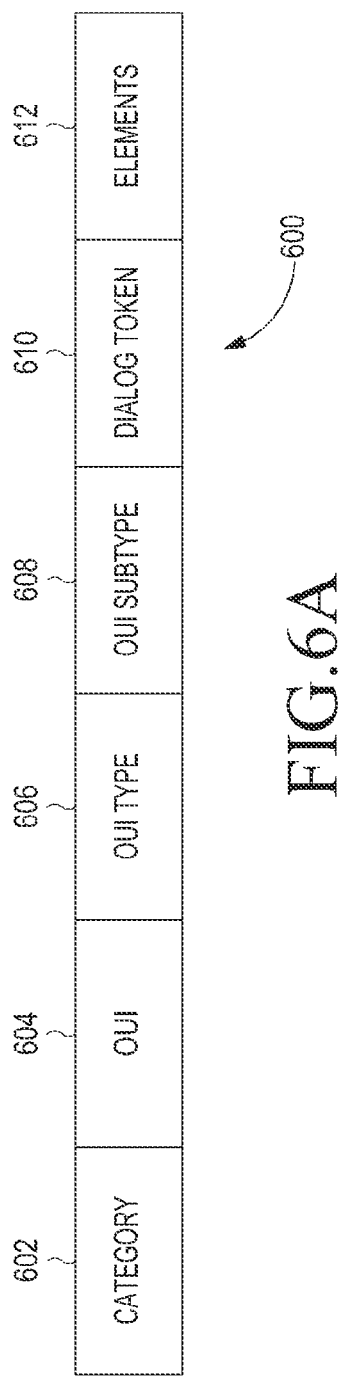

Referring to FIG. 6A, the P2P action frame format 600 includes a category field 602, an Organizational Unique Identifier (OUI) field 604, an OUI type field 606, an OUI subtype field 608, a dialog token field 610, and an elements field 612. The category field 602 is reserved for IEEE 802.11 vendor specific usage and is 1 octet in size. The category field 602 may take a value '0x7F'. The OUI field 604 includes an OUI value as defined by the Wi-Fi specification. The OUI field 604 is 3 octets in size. The OUI type field 606 indicates the type or version of an action frame. For example, the OUI type field 606 is set to a value '0x09' when the type of the action frame is Wi-Fi P2P v1.0. The OUI type field 606 is 1 octet in size.

The OUI subtype field 608 identifies the type of a P2P action frame. The OUI subtype field 608 is 1 octet in size. The different values corresponding to different types of the P2P action frame are illustrated in FIG. 6B. According to an embodiment of the present invention, a new P2P action frame type 'discovery event notification' is used when a discovery event notification frame is transmitted to the source Wi-Fi device 102 when the version of the discovery information is changed. Referring to FIG. 6B, the OUI subtype field 608 is set to a value '0x04' when the subtype of the P2P action frame is a discovery event notification. The dialog token field 610 indicates a response/request transaction when the value is non-zero. In case of no response is expected, the dialog token field 610 is set to zero. For example, if the subtype of the P2P action frame is a delivery event notification, then the dialog token field 610 is set to a value '0' to indicate that the P2P action is an event notification and no response is expected from the source Wi-Fi device 102. The elements field 612 includes a P2P IE with a discovery event notification attribute. A P2P IE format 620 is illustrated as an example in FIG. 6C.

Referring to FIG. 6C, the P2P IE format 620 includes an element ID field 622, a length field 624, an OUI field 626, an OUI type field 628, and P2P attributes field 630. The element ID field 622 indicates a value which identifies the information element as 'P2P IE'. The element ID field 622 is 1 octet in size. The element ID field 622 takes a hexadecimal value '0xDD'. The length field 624 includes a value identifying the length of the P2P IE format 620. The OUI field 626 includes an OUI value as defined by the Wi-Fi specification. The OUI field 626 is 3 octets in size. The OUI type field 628 indicates the type or version of the P2P IE. The OUI type field 628 is 1 octet in size. The OUI type field 628 is set to a value '0x09' if the type or version of the P2P IE is WFA P2P v1.0.

The P2P attributes field 630 includes content of the P2P information elements. A format of the P2P attributes 630 is shown as an example in FIG. 6D. Referring to FIG. *6d*, the P2P attributes field 630 includes an attributes ID field 632, a length field 634, and an attributes body field 636. The attributes ID field 632 indicates a type of P2P attributes. The types of P2P attributes and corresponding attributes ID are illustrated in FIG. 6E. For example, the attributes ID field 632 is set to '19' when the type of the P2P attribute is a discovery event notification attribute. The attributes body field 636 includes fields corresponding to the discovery event notification attribute. The fields of the discovery event notification attribute are illustrated as an example in FIG. 6F.

Figure 6F:

Referring to FIG. 6F, the attributes body field 636 includes an attribute ID field 638, a length field 640, an event type field 642, and a version indicator field 644. The attribute ID field 638 indicates an attribute ID associated with the discovery event notification attribute. For example, the attribute ID of the discovery event notification attribute is '19'. The attribute ID field 638 is 1 octet in size. The length field 640 indicates the length of the discovery event notification attribute body in octets. The length field is 2 octets in size. The event type field 642 indicates whether the discovery event notification is associated with the device discovery information or the service discovery information. For example, if the discovery event notification is associated with the device discovery information, then the event type field 642 is set to a value '0'. If the discovery event notification is associated with the service discovery information, then the event type field 642 is set to value '1'. The version indicator field 644 indicates a current version of the discovery information. The value of the current version may vary from 0 to 255. Once the version number reaches 255, the version number starts from 0. The value indicated in the version indicator field 644 is same as the discovery counter value maintained at the destination Wi-Fi device 104.

Figure 7:
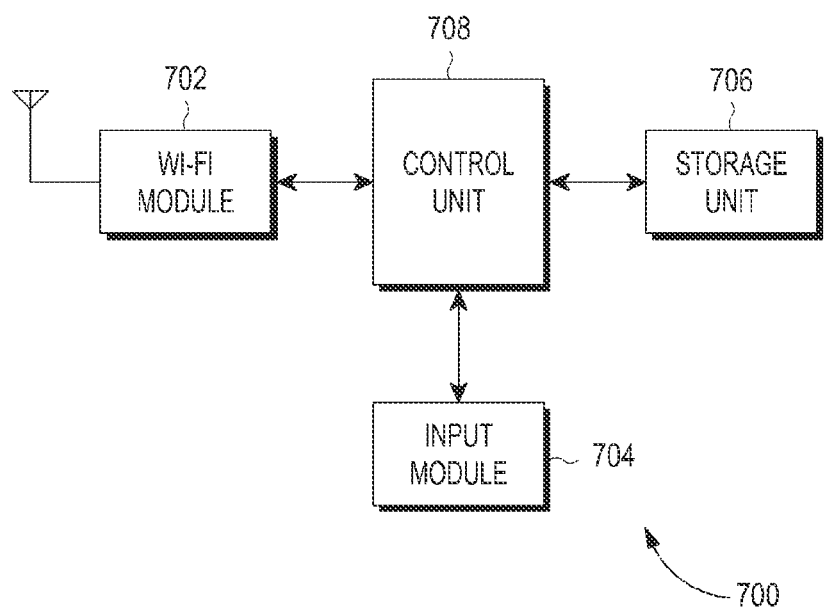
FIG. 7 is a block diagram of a configuration of a Wi-Fi device in the WFD system of FIG. 1, according to an embodiment of the present invention.

FIG. 7 is a block diagram of a configuration of a Wi-Fi device 700 in the WFD system 100 of FIG. 1, according to an embodiment of the present invention. It is appreciated that the source Wi-Fi device 102 and the destination Wi-Fi device 104 may have the same configuration as that of the Wi-Fi device 700. The Wi-Fi device 700 includes a Wi-Fi module 702, an input unit 704, a storage unit 706, and a control unit 708. Although not shown, according to the type of the Wi-Fi device, the Wi-Fi device 700 may further include various components, such as a display unit for screen data displaying, a radio frequency unit for mobile communication, an audio processing unit including a microphone and a speaker, a camera module for taking photographs, a digital broadcast receiving module for Digital Multimedia Broadcasting (DMB) or Digital Video Broadcasting (DVB), and a Bluetooth module for Bluetooth communication. These additional components are not described further for conciseness.

The Wi-Fi module 702 supports Internet Protocol (IP) based wireless communication for the Wi-Fi device 700 and is configured for transmitting and receiving various frames such as a probe request frame, a probe response frame, a discovery event notification frame, and so on. The input unit 704 generates an input signal corresponding to a user action and sends the input signal to the control unit 708. The input unit 704 may include a plurality of keys. In particular, the input unit 704 may include one or more buttons for generating an input signal to execute a Wi-Fi based function such as a Wi-Fi Protected Setup (WPS) feature for a connection setup between Wi-Fi devices 102 and 104. Alternatively, the input unit 704 may include a touch sensitive display capable of generating an input signal corresponding to a user action (e.g., tap, swipe, hover, etc).

The storage unit 706 stores various programs and information for the Wi-Fi device 700. The storage unit 706 may be composed of one or more volatile memories and non-volatile memories. For example, the storage unit 706 may store an operating system of the Wi-Fi device 700, a program and persistent discovery information for establishing a WFD connection (e.g., Wi-Fi direct peer-to-peer (P2P) or tunneled direct link setup (TDLS) connection), a program and data for capability exchange and negotiation, a program and data for establishing a WFD session with one or more Wi-Fi devices, a program and data for streaming multimedia content, and a program and data for controlling exchange of information on supported functions. Such programs and data may be stored semi-permanently or temporarily.

The control unit 708 controls the overall operation of the Wi-Fi device 700. More particularly, the control unit 708 controls an operation to provide persistence of discovery information and faster establishment of a WFD connection with other Wi-Fi devices. The control unit 708 may be capable of executing a program and data stored in the storage unit 706 to perform steps illustrated in FIGS. 2 to 6F.

For example, when the Wi-Fi device 700 is a source Wi-Fi device, the control unit 708 is configured for persistently storing discovery information obtained from other Wi-Fi devices and establishing a Wi-Fi connection based on the persistently stored discovery information. When the Wi-Fi device 700 is a destination Wi-Fi device, the control unit 708 is configured for detecting a change in the version of discovery information and indicating the change in the version of the persistently stored discovery information to a source Wi-Fi device via a discovery event notification frame.

The role of the control unit 708 is described further in relation to operation control. In addition, the control unit 708 may control regular operations of the Wi-Fi device 700. For example, when an application using mobile communication is executed, the control unit 708 may control operations related to mobile communication. When an application using a local network is executed, the control unit 708 may control operations related to local networking.

The Wi-Fi device 700 of an embodiment of the present invention may be any form of information and communication appliance, such as a mobile communication terminal supporting a communication protocol for a communication system, a smart phone, a Portable Multimedia Player (PMP), a digital broadcast receiver, a Personal Digital Assistant (PDA), a music player such as a Moving Picture Experts Group (MPEG)-1 or MPEG-2 audio layer 3 (MP3) player or a portable game console. The Wi-Fi device 700 of an embodiment of the present invention may be applied to medium to large sized devices such as a television set, a large format display, digital signage, a media kiosk, a personal computer, a laptop, a printer, a multifunction office machine, etc.

Furthermore, the various devices, modules, and the like described herein may be enabled and operated using hardware circuitry, for example, complementary metal oxide semiconductor based logic circuitry, firmware, software, and/or any combination of hardware, firmware, and/or software embodied in a machine readable medium. For example, the various electrical structures and methods may be embodied using transistors, logic gates, and electrical circuits, such as application specific integrated circuits.

The present invention has been described with reference to specific embodiments; it will be evident that various modifications and changes may be made to these embodiments without departing from the spirit and scope of the present invention as defined by the appended claims and their equivalents.

The invention claimed is:

1. A method of establishing connections in a wireless network, the method comprising:
transmitting, by a first device to a second device, a first probe request frame comprising capability information indicating the first device supports a capability to store discovery information of the second device, through a pre-defined channel;
receiving, by the first device from the second device, a first probe response frame comprising first discovery information of the second device;
storing, by the first device, the first discovery information of the second device;
establishing, by the first device, a first connection with the second device using the first discovery information;
if an establishment of a second connection with the second device is required, determining, by the first device, whether a valid time of the first discovery information has expired; and
establishing the second connection with the second device using the first discovery information if the valid time has not expired.

2. The method of claim 1, wherein if the valid time is expired, transmitting, to the second device, a second probe request frame through the pre-defined channel.

3. The method of claim 1, wherein the first probe request frame further comprises a version of third discovery information that was previously stored at the first device.

4. The method of claim 1, wherein the first discovery information comprises a device and/or service description associated with the second device and validity information indicating a time period for which the device and/or service description is valid.

5. The method of claim 1, further comprising:
receiving, from the second device, a discovery event notification frame comprising an event type indicating discovery information associated with the discovery event notification frame and a version indicator indicating a current version of the discovery information associated with the discovery event notification frame;
determining whether a version of the first discovery information is different from the current version of the discovery information;
if the version of the first discovery information is different from the current version of the discovery information, transmitting, to the second device, a second probe request frame through the pre-defined channel; and
receiving, from the second device, a second probe response frame comprising second discovery information, and storing the second discovery information.

6. A first device for establishing connections with a second device in a wireless network, the first device comprising:
a transceiver module configured to, transmit a first probe request frame comprising capability information indicating the first device supports a capability to store discovery information of the second device through a pre-defined channel, and to receive a first probe response frame comprising first discovery information of the second device; and
a control unit coupled to the transceiver module, configured to:
store the first discovery information of the second device in a storage unit,
establish a first connection with the second device using the first discovery information,
if an establishment of a second connection with the second device is required, determine, by the first device, whether a valid time of the first discovery information has expired; and
establish the second connection with the second device using the first discovery information if the valid time has not expired.

7. The first device of claim 6, wherein the transceiver module is further configured to receive, from the second device, a discovery event notification frame comprising an event type indicating discovery information associated with the discovery event notification frame and a version indicator indicating a current version of the discovery information associated with the discovery event notification frame, and wherein the control unit is further configured to determine whether a version of the first discovery information is different from the current version of the discovery information, and if the version of the first discovery information is different from the current version of the discovery information, to control the transceiver module to transmit, to the second device, a second probe request frame through the pre-defined channel, and to control the transceiver module to receive, from the second device, a second probe response frame comprising second discovery information, and to store the second discovery information.

8. The first device of claim 6, wherein the transceiver module is further configured to, if the valid time has expired, transmit, to the second device, a second probe request frame through the pre-defined channel.

9. The first device of claim 6, wherein the first probe request frame further comprises a version of discovery information that was previously stored at the first device.

10. The first device of claim 6, wherein the first discovery information comprises one of a device and service description associated with the second device and validity information indicating a time period for which one of the device and service description is valid.

11. A method of establishing a connection with a first device in a wireless network, the method comprising:
receiving, by a second device from the first device, a first probe request frame comprising capability information through a pre-defined channel;
obtaining, by the second device, the capability information indicating the first device supports a capability to store discovery information of the second device;
transmitting, by the second device to the first device, a first probe response frame comprising discovery information of the second device;
determining whether there is a change in the discovery information; and
if the change of the discovery information is detected, transmitting, to the first device, a discovery event notification frame comprising an event type indicating the change of the discovery information and a version indicator indicating a current version of the discovery information.

12. The method of claim 11, wherein the first probe request frame further comprises a version of discovery information that was previously stored at the first device.

13. The method of claim 11, wherein the discovery information comprises a device and/or service description associated with the second device and validity information indicating a time period for which the device and/or service description is valid.

14. The method of claim 11, further comprising:
receiving, from the first device, a second probe request frame through the pre-defined channel in response to the discovery event notification frame; and
transmitting, to the first device, a second probe response frame comprising the current version of the discovery information.

15. A second device for establishing a connection with a first device in a wireless network, the second device comprising:
a transceiver module configured to receive, from the first device, a first probe request frame comprising capability information through a pre-defined channel; and
a controller unit configured to:
obtain the capability information indicating the first device supports a capability to store discovery information of the second device,
control the transceiver to transmit, to the first device, a first probe response frame comprising discovery information of the second device,
determine whether there is the change in the discovery information; and
if the change of the discovery information is detected, control to transmit, to the first device, a discovery event notification frame comprising an event type indicating the change of the discovery information and a version indicator indicating a current version of the discovery information.

16. The second device of claim 15, wherein the first probe request frame further comprises a version of discovery information of the second device previously stored at the first device.

17. The second device of claim 15, wherein the discovery information comprises one of a device and service description associated with the second device and validity information indicating a time period for which one of the device and service description is valid.

18. The second device of claim 15, wherein the transceiver module is further configured to:
receive, from the first device, a second probe request frame through the pre-defined channel in response to the discovery event notification frame; and
transmit, to the first device, a second probe response frame comprising the current version of the discovery information.

* * * * *